US006236416B1

(12) United States Patent
Kuribayashi et al.

(10) Patent No.: US 6,236,416 B1
(45) Date of Patent: May 22, 2001

(54) IMAGE FORMING APPARATUS FEATURING A PLURALITY OF LIGHT EMISSION ELEMENTS ON A SINGLE CHIP

(75) Inventors: Masaki Kuribayashi, Inagi; Yuichi Hashimoto; Akihiro Senoo, both of Tokyo; Kazunori Ueno, Ebina; Seiji Mashimo, Tokyo; Hidetoshi Tsuzuki, Yokohama, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/187,398

(22) Filed: Nov. 6, 1998

(30) Foreign Application Priority Data

Nov. 11, 1997 (JP) .................................................. 9-308612

(51) Int. Cl.$^7$ ............................ B41J 2/385; G01D 15/06; G03G 15/01; G03G 13/04

(52) U.S. Cl. ........................... 347/118; 347/130; 347/232

(58) Field of Search ..................................... 347/130, 238, 347/115, 232, 237, 118; 399/299, 303; 430/58

(56) References Cited

U.S. PATENT DOCUMENTS

| | | | |
|---|---|---|---|
| 4,356,429 | 10/1982 | Tang | 313/503 |
| 4,435,064 * | 3/1984 | Tsukada et al. | 347/130 X |
| 4,539,507 | 9/1985 | VanSlyke et al. | 313/504 |
| 4,720,432 | 1/1988 | VanSlyke et al. | 428/457 |
| 4,721,977 * | 1/1988 | Fukae | 347/238 X |
| 4,769,292 | 9/1988 | Tang et al. | 428/690 |
| 4,885,211 | 12/1989 | Tang et al. | 428/457 |
| 4,888,603 * | 12/1989 | Hart et al. | 347/238 X |
| 4,906,544 * | 3/1990 | Osawa et al. | 430/58 |
| 4,950,950 | 8/1990 | Perry et al. | 313/504 |
| 5,047,687 | 9/1991 | VanSlyke et al. | 313/503 |
| 5,059,861 | 10/1991 | Littman et al. | 313/503 |
| 5,059,862 | 10/1991 | VanSlyke et al. | 313/503 |
| 5,061,617 | 10/1991 | Maskasky | 430/569 |
| 5,073,446 | 12/1991 | Scozzafava et al. | 428/323 |
| 5,151,629 | 9/1992 | VanSlyke | 313/504 |
| 5,294,869 | 3/1994 | Tang et al. | 313/504 |
| 5,294,870 | 3/1994 | Tang et al. | 313/504 |
| 5,339,150 | 8/1994 | Hubble, III et al. | 399/49 |
| 5,497,225 | 3/1996 | Matsuzuki | 399/223 |
| 5,610,685 | 3/1997 | Aiba | 347/238 X |
| 5,740,493 * | 4/1998 | Otaki et al. | 399/299 X |
| 5,793,405 * | 8/1998 | Shakuda | 347/238 |
| 5,874,984 * | 2/1999 | Scholz et al. | 347/238 |
| 6,002,420 * | 12/1999 | Tanioka et al. | 347/238 X |
| 6,052,136 * | 4/2000 | Tanioka et al. | 347/118 |
| 6,121,994 * | 9/2000 | Kuribayashi et al. | 347/237 |

FOREIGN PATENT DOCUMENTS

| | | |
|---|---|---|
| 44 34 081 | 5/1995 | (DE) . |
| 195 14 073 | 11/1995 | (DE) . |
| 0 335 553 | 10/1989 | (EP) . |
| 0 349 265 A2 | 1/1990 | (EP) . |
| 0 464 948 | 1/1992 | (EP) . |
| 0 547 854 | 6/1993 | (EP) . |
| 0 618 078 | 10/1994 | (EP) . |
| 0 704 915 | 4/1996 | (EP) . |
| 8-48052 * | 2/1996 | (JP) . |

* cited by examiner

*Primary Examiner*—Susan S. Y. Lee
(74) *Attorney, Agent, or Firm*—Fitzpatrick, Cella, Harper & Scinto

(57) ABSTRACT

An image forming apparatus includes a photosensitive member, an exposure device includes a single-chip light emission element array formed by integrating a plurality of light emitting elements in a single chip which exposure device executes the exposure in the main scanning direction relative to the movement of the photosensitive member, by the light emission from the single-chip light emission element array, and a developing device provided around the photosensitive member.

20 Claims, 3 Drawing Sheets

IMAGE FORMING APPARATUS FEATURING A PLURALITY OF LIGHT EMISSION ELEMENTS ON A SINGLE CHIP

BACKGROUND OF THE INVENTION

1. Field of the Invention

The present invention relates to an image forming apparatus such as an electrophotographic copying apparatus, and more particularly to an image forming apparatus having a linear array of a plurality of photosensitive members and utilizing such photosensitive members in an independent manner, thereby forming cyan, magenta, yellow and black images respectively corresponding to the photosensitive members and synthesizing these images to form a color image.

2. Related Background Art

There is already known a laser beam image forming apparatus, in which laser light sources are provided as image exposure means respectively corresponding to four electrophotographic photosensitive members arranged in a linear array and are controlled respectively corresponding to the image information of cyan, magenta, yellow and black colors to form electrostatic latent images respectively corresponding to the cyan, magenta, yellow and black colors on the four electrophotographic photosensitive members, then such electrostatic latent images are respectively developed and the developed images are synthesized to obtain a color image.

Also there is known an LED light image forming apparatus in which four LED's are provided respectively corresponding to the photosensitive members, as the light sources for forming the electrostatic latent images of cyan, magenta, yellow and black colors, in place for the laser beam sources in the above-mentioned image forming apparatus.

In the aforementioned laser beam image forming apparatus, in order to synthesize the images of cyan, magenta, yellow and black colors in mutually registered manner, it is required to exactly match the scanning operations of the four laser light sources, provided respectively on the four photosensitive members, securely in the main and subscanning directions, but in practice it is difficult to exactly match the four laser lights in the main and subscanning directions.

On the other hand, in the above-mentioned LED light image forming apparatus, it is relatively easy to meet the above-described requirements of matching in the main and subscanning directions, but such apparatus is even more expensive since a plurality of expensive LED chips have to be jointed in a linear array to obtain a jointed LED element. Besides, since the LED chips fluctuate in the light emission characteristics, the image reproducibility is deteriorated in the main scanning exposure direction, relative to the movement of the photosensitive member, to be exposed by the above-described jointed LED element, because the exposure condition differs for each LED chip.

Also in the electrophotographic copying apparatus capable of forming a color image, the above-described jointed LED element has to be provided for each of the plurality of photosensitive members, and the light emission characteristics become different among the plurality of jointed LED elements corresponding to the plurality of photosensitive members. Consequently, there emerges a difficult requirement of matching the light emission characteristics among such jointed LED elements.

SUMMARY OF THE INVENTION

An object of the present invention is to resolve the fluctuation in the light emission characteristics in the main scanning direction, encountered in the image forming apparatus, particularly electrophotographic copying apparatus, employing a jointed LED element as the exposure device.

Another object of the present invention is to resolve the fluctuation in the light emission characteristics among the plurality of jointed LED elements, encountered in the color image forming apparatus employing a plurality of photosensitive members and exposure devices consisting of a plurality of jointed LED elements provided respectively corresponding to the photosensitive members.

The above objects can be achieved by the present invention described below.

According to the present invention there is provided an image forming apparatus comprising: a photosensitive member; an exposure means including a single-chip light emission element array formed by integrating a plurality of light emitting elements in a single chip which exposure means executes the exposure in the main scanning direction relative to the movement of the photosensitive member, by the light emission from said single-chip light emission element array; and a developing means provided around said photosensitive member.

According to the present invention there is also provided an image forming apparatus comprising: a plurality of photosensitive members provided mutually independently; an exposure means including a plurality of single-chip light emission element arrays obtained by forming, on a single substrate, a plurality of light emission element arrays each consisting of a plurality of light emitting elements and separating each of said plurality of light emission element arrays, and constructed by positioning said plurality of single-chip light emission element arrays respectively corresponding to said plurality of photosensitive members; and a plurality of developing means provided respectively around said plurality of photosensitive members.

DESCRIPTION OF THE PREFERRED EMBODIMENTS

Figure 1:
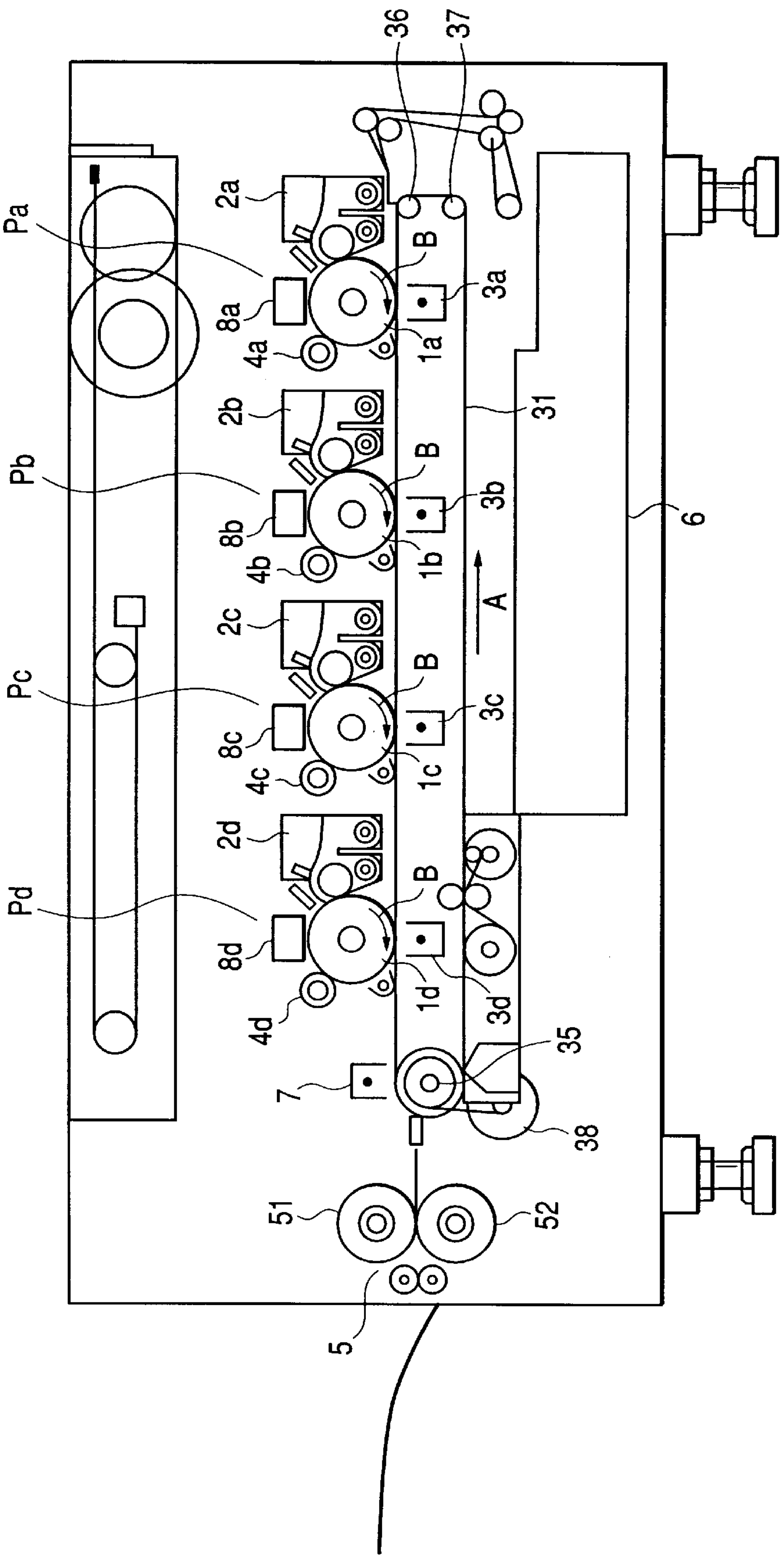
FIG. 1 is a cross-sectional view of an image forming apparatus according to the present invention.

The present invention is firstly featured by an image forming apparatus provided with a photosensitive member, exposure means having a single-chip light emission element array formed by integrating a plurality of light emission elements in a single chip and adapted to execute the entire exposure in the main scanning direction (with a main scanning distance D) relative to the movement of the photosensitive member by the light emission from the single-chip light emission element array, and developing means provided around the photosensitive member.

The present invention is secondly featured by an image forming apparatus provided with mutually independent photosensitive members, a plurality of single-chip light emission element arrays each of which consists of integrated light emission elements and is obtained by forming light emission element arrays, each consisting of such plurality of light emission elements, in a plurality of rows on a single substrate and mutually separating such plurality of rows of the light emission element arrays, and a plurality of developing means provided respectively around the plurality of photosensitive members.

In a first preferred embodiment of the present invention, the light emission element is an organic light emission element.

In a second preferred embodiment of the present invention, the photosensitive member is an organic or inorganic electrophotographic photosensitive member.

In a third preferred embodiment of the present invention, the above-described mutually independent photosensitive members are respectively shaped as drums and are arrayed linearly.

In a fourth preferred embodiment of the present invention, the plurality of single-chip light emission element arrays, provided respectively corresponding to the plurality of photosensitive members, are independently connected to first drive means for driving cyan image information for forming a cyan image, second drive means for driving magenta image information for forming a magenta image, and third drive means for driving yellow image information for forming a yellow image.

In a fifth preferred embodiment of the present invention, the plurality of single-chip light emission element arrays, provided respectively corresponding to the plurality of photosensitive members, are independently connected to first drive means for driving cyan image information for forming a cyan image, second drive means for driving magenta image information for forming a magenta image, third drive means for driving yellow image information for forming a yellow image, and fourth drive means for driving black image information for forming a black image.

In a sixth preferred embodiment of the present invention, the plurality of developing means comprise first developing means for forming a cyan image, second developing means for forming a magenta image, and third developing means for forming a yellow image which are independently operable each other.

In a seventh preferred embodiment of the present invention, the plurality of developing means comprise first developing means for forming a cyan image, second developing means for forming a magenta image, third developing means for forming a yellow image, and fourth developing means for forming a black image which are independently operable each other.

In an eighth preferred embodiment of the present invention, the chip length of the single-chip light emission element array is so selected that the entire main scanning length, relative to the movement of the photosensitive member, can be exposed with such single-chip array.

In a ninth preferred embodiment of the present invention, the photosensitive members are respectively in the form of a drum having the same diameter.

In a tenth preferred embodiment of the present invention, the photosensitive members are composed of a same photosensitive layer.

Now, the present invention will be clarified in detail by describing preferred embodiments, with reference to the attached drawings. FIG. 1 is across-sectional view of a color electrophotographic copying apparatus, which is the image forming apparatus of the present invention.

In the illustrated color copying apparatus, a printing medium such as paper is housed in a cassette 6 and is fed to a transport unit from the cassette 6, along the progress of an image forming operation (hereinafter also called printing operation). A conveyor belt 31, being supported between a driving roller 35 and two idler rollers 36 and 37, constitutes a transport unit and is rendered capable of motion between the roller 35 and the rollers 36 and 37, in a direction indicated by an arrow A under the belt 31, as the driving roller 35 is rotated by a motor 38.

Along the conveyor belt 31, there are provided four image forming units Pa, Pb, Pc and Pd of a similar structure. The configuration of such units will be briefly explained in the following, taking the image forming unit Pa for the first color as an example.

In the image forming unit Pa, a cylindrical photosensitive member or a photosensitive drum 1*a,* rotating in a direction of an arrow B, is provided in the vicinity of the conveyor belt 31. In the course of rotation of the photosensitive drum 1*a,* a photosensitive layer provided on the surface thereof is uniformly charged by a primary charger 4*a,* consisting of a contact charger. Then, the charged photosensitive layer is exposed to a light image of the yellow component of the original image, by the light emission from exposure means 8*a* consisting of the aforementioned single-chip light emission element array adapted to irradiating the entire main scanning area of the photosensitive drum, thereby forming an electrostatic latent image of the yellow component. The portion bearing such electrostatic latent image moves in succession by its rotation to the position of a yellow developing unit 2*a* and is rendered visible therein by image development with yellow toner supplied from the yellow developing unit 2*a.*

The yellow toner image reaches, by the rotation of the photosensitive drum 1*a,* a transfer position corresponding to a corona charger 3*a,* opposed to the drum 1*a* across the conveyor belt 31. In synchronization, the printing medium is transported to the transfer position by the conveyor belt 31. Subsequently a transfer bias voltage is applied to the corona charger 3*a,* whereby the yellow toner image borne on the photosensitive drum 1*a* is transferred onto the printing medium along the rotation of the photosensitive drum 1.

With the rotation of the photosensitive drum 1*a,* the toner remaining therein is eliminated by a cleaning unit (not shown), whereby the photosensitive drum is readied for entering the next image forming cycle. On the other hand, the printing medium bearing the transferred yellow toner image is transported by the conveyor belt 31 to the printing portion composed of the image forming unit Pb of the second color.

The image forming unit Pb of the second color has a configuration similar to that of the image forming unit Pa of the first color, wherein the exposure of the light image of the magenta component of the original image is executed by the light emission from the exposure means 8*b* employing the single-chip light emission element array in a similar manner as explained above to form an electrostatic latent image of the magenta component. Then the latent image is developed with magenta toner to obtain a magenta toner image which is transferred, in a transfer position, onto the printing medium in superposition with the yellow toner image formed previously. Similarly, in the course of transportation of the printing medium, electrostatic latent images of cyan component and black component are formed in the image forming units Pc and Pd by the light emissions from the exposure means 8*c* and 8*d* consisting of the single-chip light emission element arrays, and a cyan toner image and a black toner image respectively formed in these units are transferred in superposition, whereby a color image consisting of superposed four color toner images is obtained on the printing medium.

As in the image forming unit Pa of the first color, the image forming units Pb, Pc and Pd of the second, third and fourth colors are provided respectively with photosensitive drums 1*b,* 1*c* and 1*d;* magenta, cyan and black developing units 2*b,* 2*c* and 2*d;* corona chargers 3*b,* 3*c* and 3*d;* and primary chargers 4*b,* 4*c* and 4*d* consisting of contact chargers.

After having passed through the processes in the image forming units Pa, Pb, Pc and Pd, the printing medium bearing the toner images of four colors is further transported, then subjected to charge elimination by a corona separator 7, separated from the conveyor belt 31 and is transferred to a fixing unit 5 provided with a fixing roller 51 and a pressure roller 52 positioned in a pair. The transferred toner images are fixed by pressurization and heating in a nip portion of the rollers 51 and 52 which are normally heated to a predetermined temperature. Subsequently, the printing medium is discharged from the copying apparatus.

Figure 2:
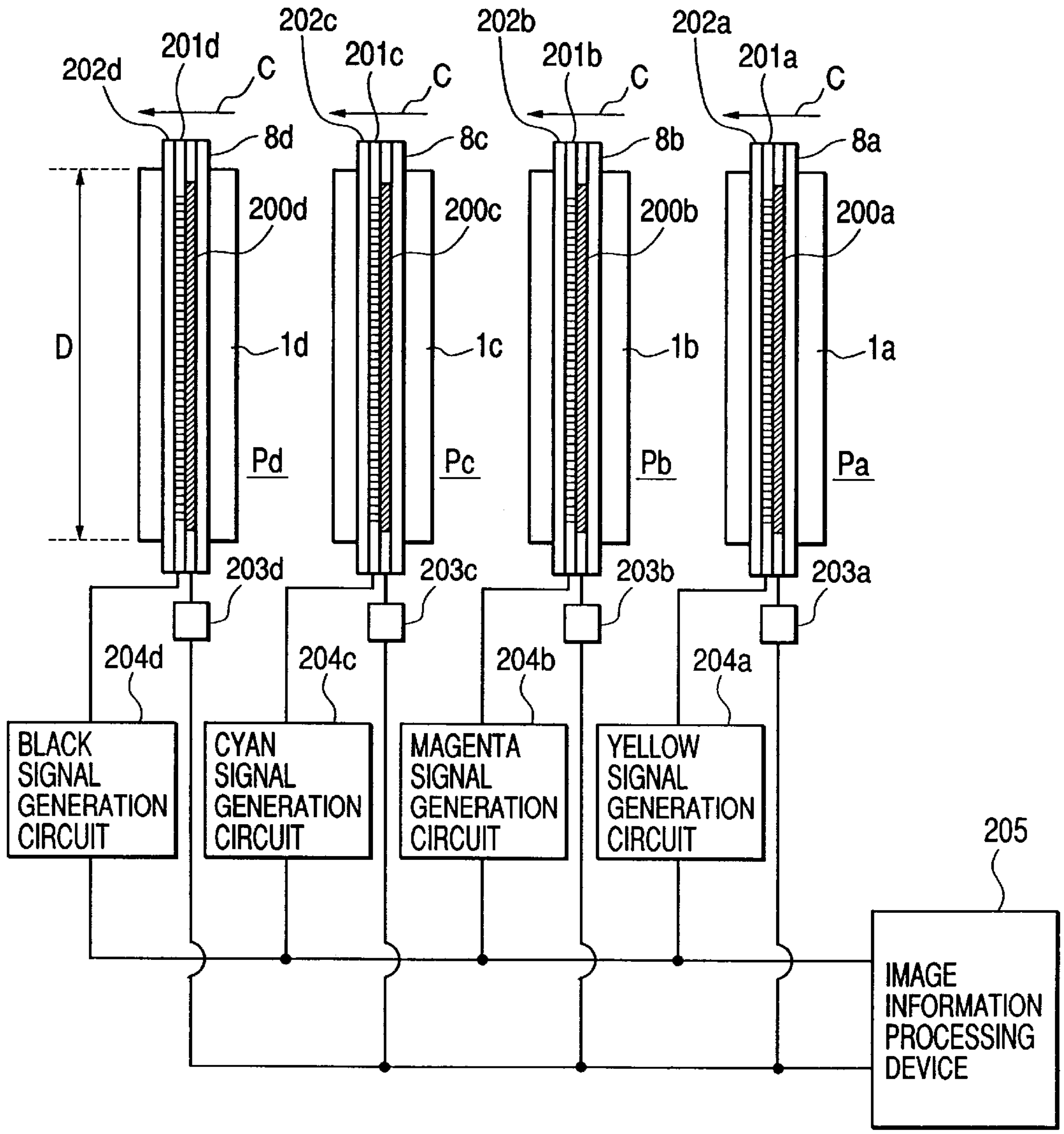
FIG. 2 is a block diagram of an exposure unit employed in the image forming apparatus according to the present invention.

FIG. 2 is a block diagram showing the details of the image forming units Pa, Pb, Pc and Pd shown in FIG. 1.

In the image forming units Pa, Pb, Pc and Pd, the exposure means 8*a,* 8*b,* 8*c* and 8*d* positioned respectively corresponding to the photosensitive drums 1*a,* 1*b,* 1*c* and 1*d* are provided respectively with a light emission element array 200*a* for yellow, a light emission element array 200*b* for magenta, a light emission element array 200*c* for cyan and a light emission element array 200*d* for black, which are respectively connected a yellow signal drive circuit (IC) 202*a,* a magenta signal drive circuit (IC) 202*b,* a cyan signal drive circuit (IC) 202*c* and a black signal drive circuit (IC) 202*d* through wiring units 201*a,* 201*b,* 201*c* and 201*d* including lead wires arranged with a high density, whereby each light emission element is controlled in a light emitting state or a light non-emitting state by the function of the drive circuit. Thus, the light emitting operations of the light emission element arrays are controlled according to the image signals from a yellow signal generation circuit 204*a,* a magenta signal generation circuit 204*b,* a cyan signal generation circuit 204*c* and a black signal generation circuit 204*d.* The light emitting elements employed in the above-mentioned yellow, magenta, cyan and black light emission element arrays 200*a,* 200*b,* 200*c* and 200*d* form a linearly arrayed member (an arrayed member on a row or a column) with a high resolution of, for example, 1,200 dpi.

A counter electrode provided in each of the yellow light emission element array 200*a,* magenta light emission element array 200*b,* cyan light emission element array 200*c* and black light emission element array 200*d* is utilized as a common electrode, and the timing of respective driving operations is controlled by a yellow common drive circuit 203*a,* a magenta common drive circuit 203*b,* a cyan common drive circuit 203*c* and a black common drive circuit 203*d.* The common driving operations, as well as the yellow, magenta, cyan and black image signals, are controlled by an image information processing unit 205 in a CPU (not shown).

For each of the yellow light emission element array 200*a,* magenta light emission element array 200*b,* cyan light emission element array 200*c* and black light emission element array 200*d* of the present invention, there is employed a single-chip (one-chip) light emission element array so positioned as to cover the entire main scanning distance D in the main scanning direction relative to the rotating displacement of the photosensitive drum 1*a,* 1*b,* 1*c* or 1*d.* In each of these arrays 200*a,* 200*b,* 200*c* and 200*d,* light emitting elements are integrated on a single chip with a high resolution in excess of 600 dpi, such as 1,200 dpi or even higher, so that the single chip covers the entire main scanning distance D of the photosensitive member.

In a preferred embodiment of the present invention, the above-described single-chip light emission element arrays employed in the yellow, magenta, cyan and black light emission element arrays 200*a,* 200*b,* 200*c* and 200*d* are formed on a single substrate and are then cut into four units as will explained in the following discussion.

In FIG. 2, arrows C indicate the sub scanning direction of the rotating photosensitive members. The photosensitive drums 1*a,* 1*b,* 1*c* and 1*d* are composed of aluminum pipes of a same diameter (for example a diameter of 60, 30 or 20 cm) and are provided with a same organic photoconductive layer or an a-Si photosensitive layer, so that they have a same moving speed in the sub scanning direction C.

Figure 3:
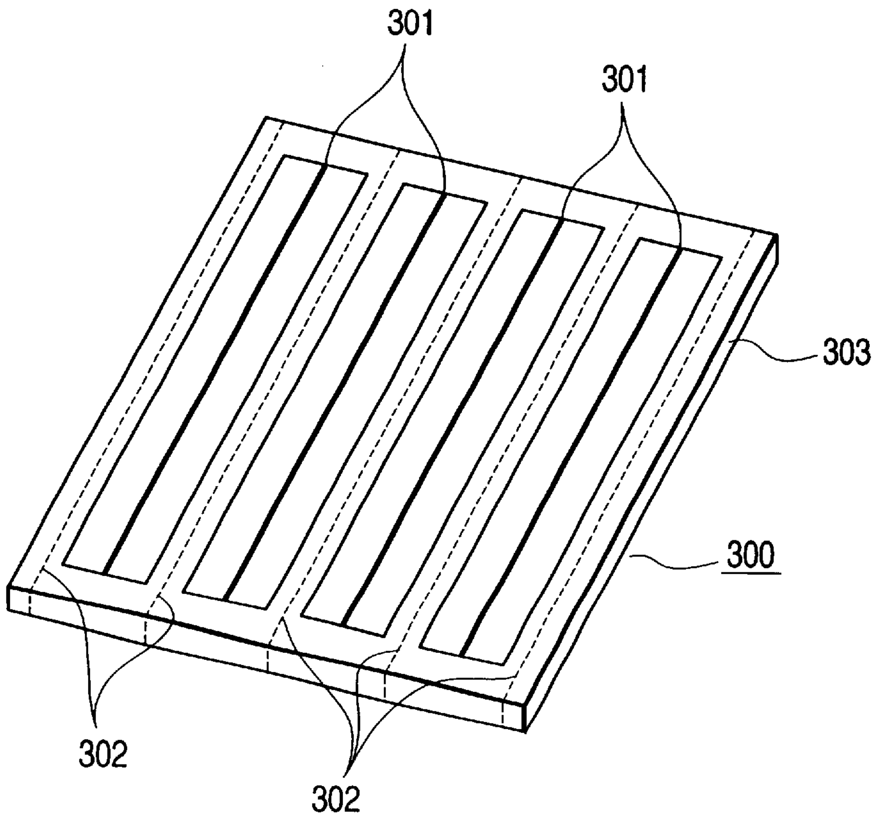
FIG. 3 is a perspective view of a single-chip light emission element array formed on a single substrate employed in the present invention.

FIG. 3 is a perspective view of a single-chip light emission element array substrate 300 provided on a single glass substrate 303 at a prior step in which single-chip light emission element arrays 301 employed in the above-described yellow, magenta, cyan and black light emission element arrays 200*a,* 200*b,* 200*c* and 200*d* shown in FIG. 2 have not been cut into four arrays along separation lines 302.

The glass substrate 303 to be employed in the present invention may have any size as long as the light emission element arrays can be formed in a single chip.

Figure 4:
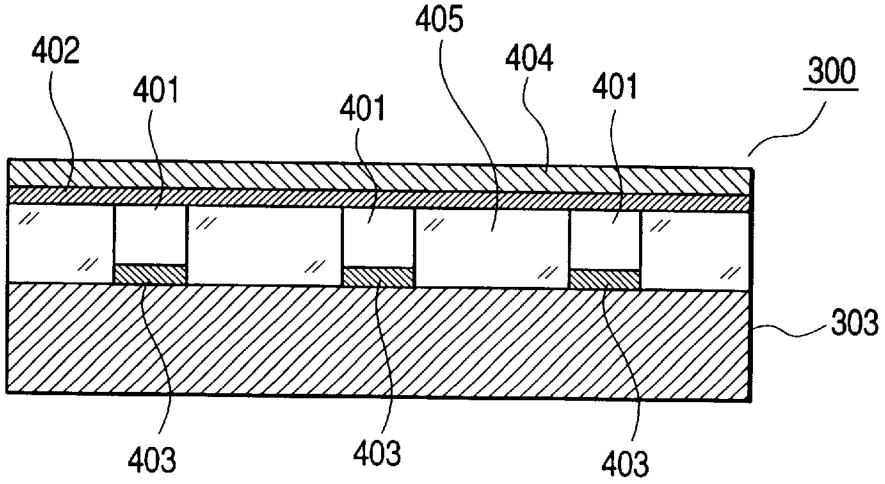
FIG. 4 is a cross-sectional view of the light emission element array employed in the present invention.

FIG. 4 is a cross-sectional view of the single-chip light emission element array 301 in the longitudinal direction thereof, in the single-chip light emission element array substrate 300 on the glass substrate 303 shown in FIG. 3. Each light emitting element is composed of a segment electrode 403, a counter electrode 402 and a light emitting layer 401 provided between the paired electrodes 402 and 403. In a preferred configuration, an insulating layer (not shown) can be provided between the segment electrode 403 and the light emitting layer 401 or between the counter electrode 402 and the light emitting layer 401. As explained in the foregoing discussion, the counter electrode 402 is used as a common electrode for applying a common signal, while the segment electrode 403 is used as an information signal electrode for applying an image signal. The light emitting elements on a single substrate are covered by a protective layer 404, and a sealant 405 is provided for mutually separating the light emitting elements.

The light emitting layer 401 of the light emitting elements of the present invention is preferably composed of an organic electroluminescent (EL) light emitting element, but it can also be composed of an inorganic EL element.

In the following there will be explained examples of the organic EL that can be employed in the present invention.

Examples of the materials constituting the organic EL to be employed in the present invention include those disclosed in EP-A-349,265 (1990) assigned to Scozzafava; U.S. Pat. No. 4,356,429 assigned to Tang.; U.S. Pat. No. 4,539,507 assigned to VanSlyke et al.; U.S. Pat. No. 4,720,432 assigned to VanSlyke et al.; U.S. Pat. No. 4,769,292 assigned to Tang et al.; U.S. Pat. No. 4,885,211 assigned to Tang et al.; U.S. Pat. No. 4,950,950 assigned to Perry et al.; U.S. Pat. No. 5,059,861 assigned to Littman et al.; U.S. Pat. No. 5,047,687 assigned to VanSlyke; U.S. Pat. No. 5,073, 446 assigned to Scozzafava et al.; U.S. Pat. No. 5,059,862 assigned to VanSlyke et al.; U.S. Pat. No. 5,061,617 assigned to VanSlyke et al.; U.S. Pat. No. 5,151,629 assigned to VanSlyke; U.S. Pat. No. 5,294,869 assigned to Tang et al.; and U.S. Pat. No. 5,294,870 assigned to Tang et al.

The EL layer is composed of an organic hole injection/transfer layer in contact with an anode, and an electron injection/transfer layer which forms a junction with the organic hole injection/transfer layer. The hole injection/transfer layer is formed by a single material or plurality of materials, and is composed of a hole injection layer which is in contact with an anode and with a continuous hole transfer layer provided between the hole injection layer and an electron injection/transfer layer. Similarly the electron injection/transfer layer is formed by a single material or a plurality of materials, and is composed of an electron injection layer which is in contact with the anode and with a continuous electron transfer layer provided between the electron injection layer and the hole injection/transfer layer. The hole-electron recombination and luminescence take place in the electron injection/transfer layer, adjacent to the junction between the electron injection/transfer layer and the hole injection/transfer layer. The compound constituting the organic EL layer is typically deposited by evaporation, but it can also be deposited by other known methods.

In a preferred embodiment, the organic material constituting the hole injection layer has the following general formula:

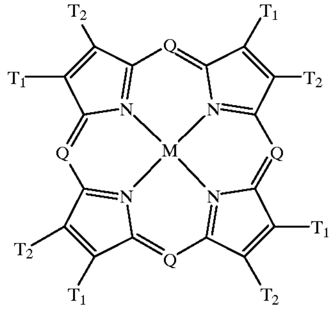

wherein:

Q is N or C—R, in which R is an alkyl radical such as methyl or ethyl);

M is a metal atom, a metal oxide or a metal halide;

T1 and T2 are independently each other a hydrogen atom, an alkyl radical or a radical of an unsaturated six-membered ring which is unsubstituted or substituted by a substituent such as a halogen atom. A preferred alkyl radical may contains 1 to 6 carbon atoms and a preferred radical of the unsubstituted unsaturated six-membered ring may be an aryl radical such as a phenyl radical.

In a preferred embodiment, the hole transfer layer is composed of an aromatic tertiary amine, of which a preferred subclass includes tetraaryldiamine represented by the following formula:

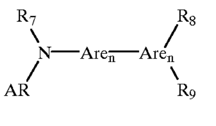

wherein Are is an arylene radical; n is an integer of from 1 to 4; and AR, $R_7$, $R_8$ and $R_9$ are independently each other selected aryl radicals. In a preferred embodiment, the luminescent electron injection/transfer layer contains a metal oxinoid compound, of which preferred examples are represented by the following general formula:

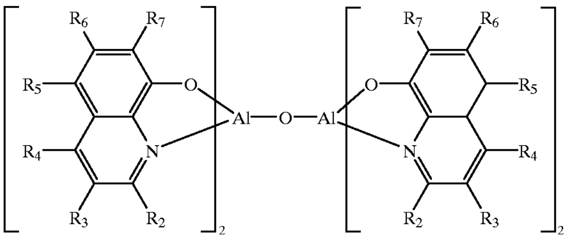

wherein $R_2$ to $R_7$ respectively mean possible substituents. In another preferred embodiment, the metal oxinoid compound is represented by the following formula:

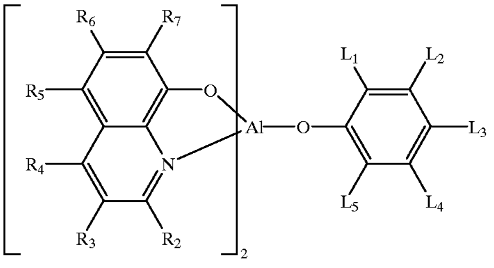

wherein $R_2$ to $R_7$ have the same meaning as defined above; and $L_1$ to $L_5$ represent independently each other a hydrogen atom or a hydrocarbon radical containing 1 to 12 carbon atoms, and $L_1$ and $L_2$ or $L_2$ and $L_3$ together may form a fused benzo ring. In another preferred embodiment, the metal oxinoid compound is represented by the following formula:

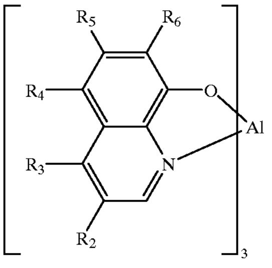

wherein $R_2$ to $R_6$ respectively represent a hydrogen atom or a possible substituent. The examples described above merely represent the preferred organic material that can be employed in the electroluminescent layer. Such examples are not intended to limit the scope of the present invention but merely designate the organic electroluminescent layer in general sense. As will be understood from the foregoing examples, the organic EL material contains a coordinate compound having an organic ligand.

The segment electrode 403 to be employed in the light emitting element of the present invention can be composed of reflective metal such as aluminum, silver, zinc, gold or chromium, and the counter electrode 402 can be composed of a transparent conductive film such as Indium Tin Oxide (ITO) or tin oxide.

The sealant 405 to be employed in the present invention can be composed of inorganic insulating substance such as silicon oxide or silicon nitride, or organic insulating resin such as epoxy resin. Also the protective film 404 to be employed in the present invention can be composed of a film of an inorganic insulating substance such as silicon oxide or silicon nitride, or organic insulating resin such as epoxy resin.

In the image forming apparatus of the present invention, the photosensitive layer of the photosensitive members 1*a,* 1*b,* 1*c* and 1*d* can be composed of an organic photoconductive substance such as photosensitive benzoxazols, photosensitive benzothiazols or photosensitive triphenylamines, or an inorganic photoconductive substance such as photosensitive amorphous silicon (a-Si), photosensitive amorphous silicon-germanium (a-SiGe) alloys or photosensitive amorphous silicon carbide (a-SiC).

On the element prepared in the above-described manner, the protective film (404) was prepared by sputtering silicon nitride in a thickness of 150 nm. The steps from the formation of the organic layer to the formation of the protective layer were executed in a same vacuum chamber.

As the anode of the organic LED there is preferably used a material with a large work function, and may be used, in addition to ITO employed in the present embodiment, for example, tin oxide, gold, platinum, palladium, selenium, iridium or copper iodide.

On the other hand, as the cathode there is preferably used a material with a small work function, and may be used, in addition to Mg/Ag employed in the present embodiment, for example, Mg, Al, Li, In or alloys thereof.

As to the hole transport layer there may be used, in addition to TPD, any of the organic substances shown in the following Table 1.

In addition to such organic substances, there may also be employed an inorganic substance such as a-Si or a-SiC.

As to the electron transport layer there may be used, in addition to $Alq_3$, any of the substances shown in the following Table 2.

Also the electron transport layer or the hole transport layer may be doped with a dopant dye shown in the following Table 3.

The material constituting the organic LED desirably has a light emission spectrum matching the sensitivity of the photosensitive drum to be used.

EXAMPLE

On a glass substrate 303 of 230 mm×40 mm×0.7 mm, a metal mask with a line width of 50 μm and a line pitch of 80 μm was placed and ITO was sputtered with a thickness of 100 nm to form the anode 403. The transparent substrate was then subjected to UV ion rinsing treatment for 30 minutes at 150° C.

Then, N,N'-bis(3-methylphenyl)-N,N'-diphenyl-(1,1'-biphenyl)-4,4'-diamine (hereinafter represented as TPD) as the hole transport layer and tris(8-quinolynol)aluminum (hereinafter represented as $Alq_3$) as the electron transport layer were deposited by vacuum deposition with respective thicknesses of 50 nm in this order. The vacuum deposition was executed under vacuum of $1\times10^{-6}$ torr and with a film forming rate of 0.3 nm/sec. The organic layer 401 was formed in the above-explained manner.

Then, a metal mask with a line width of 40 μm was placed and Mg and Ag were codeposited with a deposition rate ratio of 10:1, whereby a Mg/Ag alloy (Mg:Ag=10:1) was deposited with a thickness of 200 nm to form the cathode 402. The film forming rate was 1 nm/sec.

The single-chip light emission element array substrate 300 prepared in this manner was then cut along the separation lines 302 shown in FIG. 3 to obtain four single-chip light emission element arrays 301 each having a size of 230 mm×10 mm. Then a cover glass of a dimension of 220 mm×5 mm×0.5 mm was placed on the elements and was sealed with epoxy resin.

The steps from the cutting to the sealing were executed in a nitrogen atmosphere.

The single-chip light emission element array thus prepared was connected to a driver and was given a DC voltage, with the positive side at the ITO electrode and the negative side at the Mg/Ag electrode, whereby green light was emitted from the intersection of the ITO electrode and the Mg/Ag electrode.

The four single-chip light emission element arrays thus prepared were measured as to a fluctuation in the amount of light emission among the pixels.

As a result, the fluctuation in the amount of light emission from each pixels of a single-chip light emission element array was within ±3%, and the fluctuation in the amount of light emission among the four single-chip light emission element arrays was also within ±3%.

TABLE 1

| Materials used for the hole transport layer | |
|---|---|
| 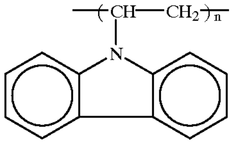, | 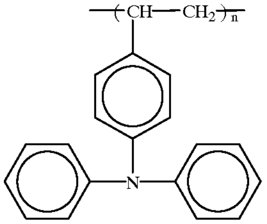, |

TABLE 1-continued
| Materials used for the hole transport layer |
| --- |
| 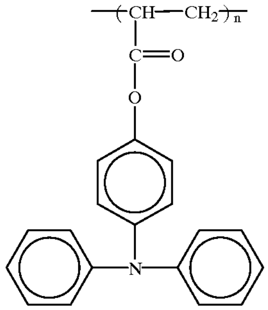 , 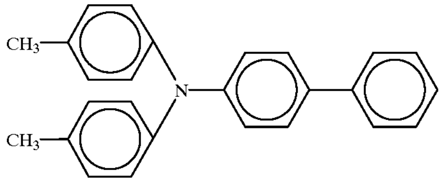 , |
| 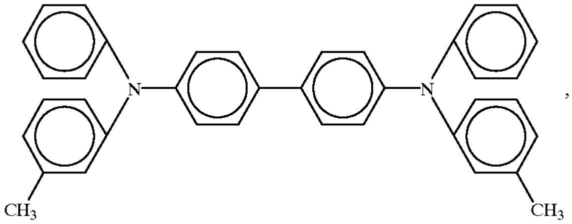 , 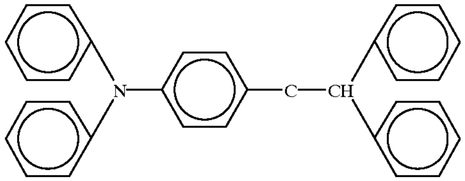 , |
| 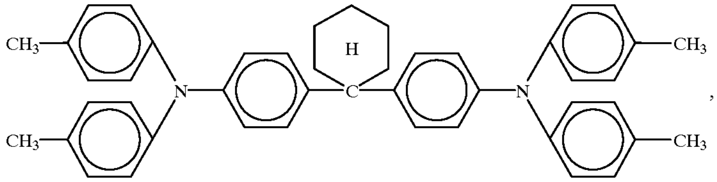 , |
| 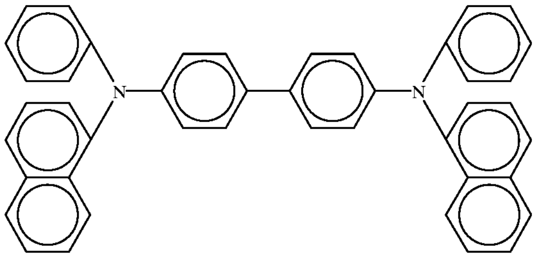 , 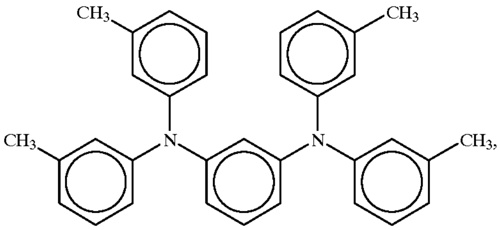 |
| 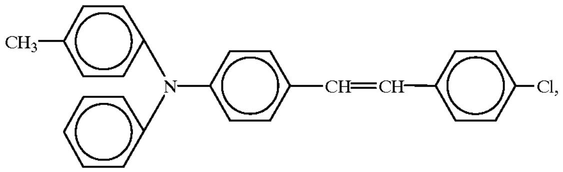 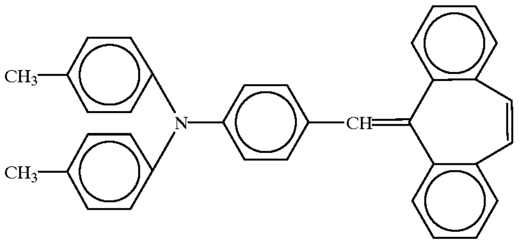 , |
| 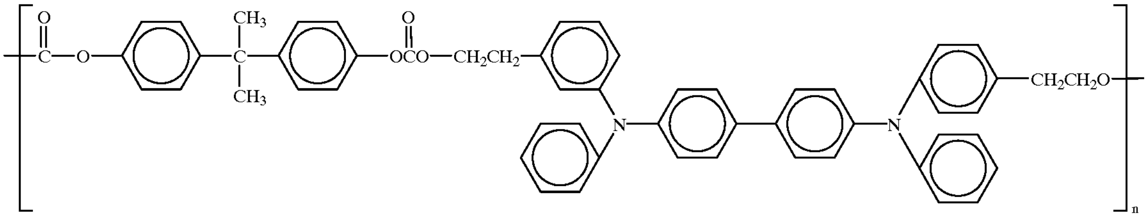 , |

TABLE 1-continued
Materials used for the hole transport layer
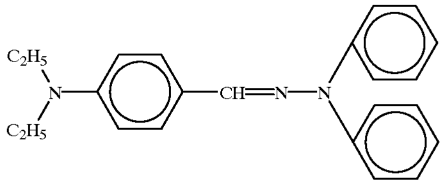
,
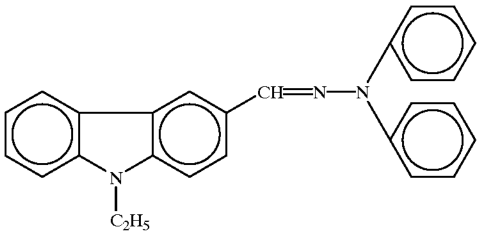
,
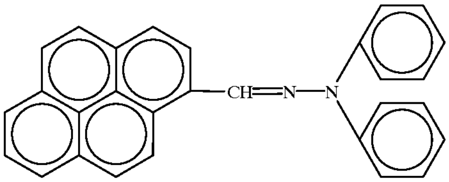
,
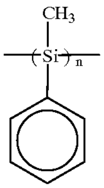
,
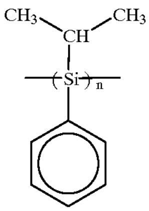
,
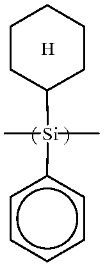
,
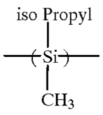
,
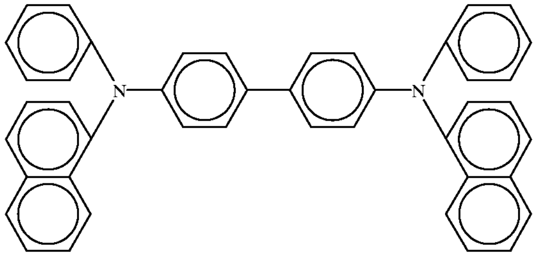
,
and
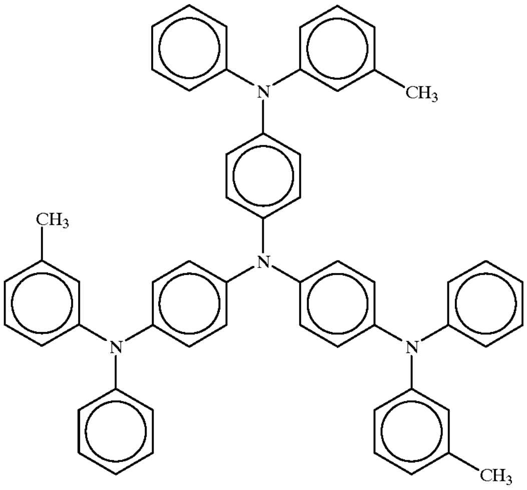
.

TABLE 2
| Materials used for the electron transport layer |
|---|
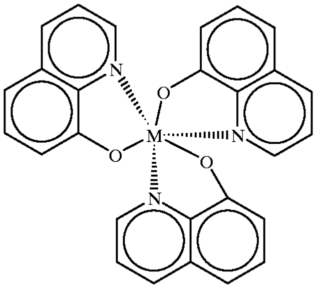,
M: Al, Ga
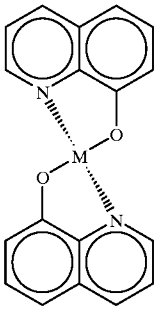,
M: Zn, Mg, Be
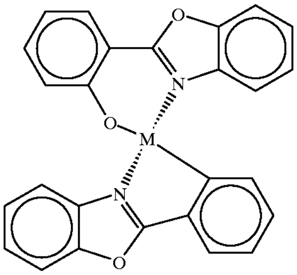,
M: Zn, Mg, Be
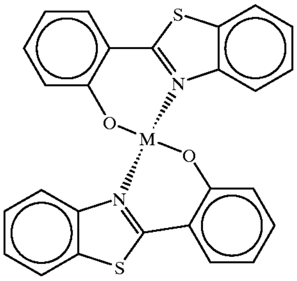,
M: Zn, Mg, Be
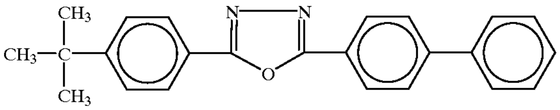,
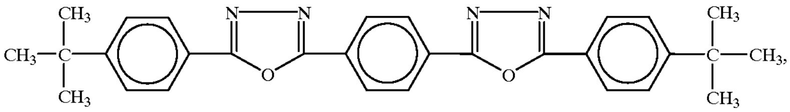
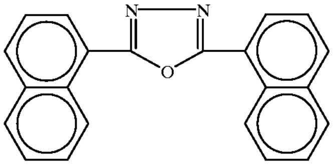,
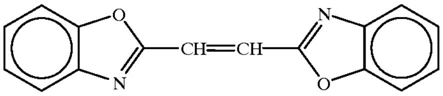,
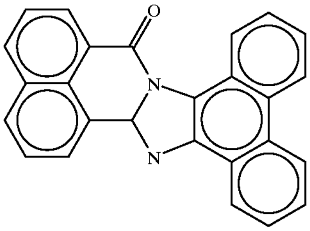,
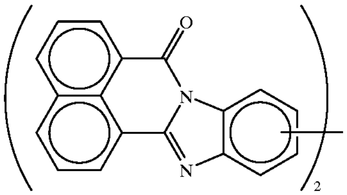, TABLE 2-continued
Materials used for the electron transport layer
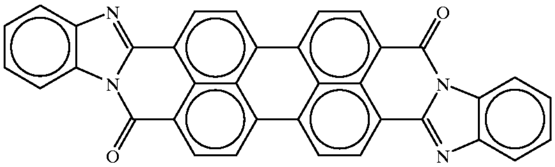,
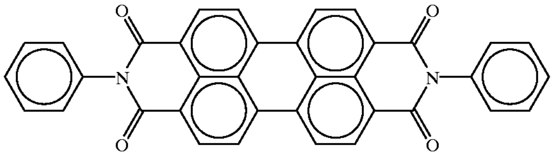,
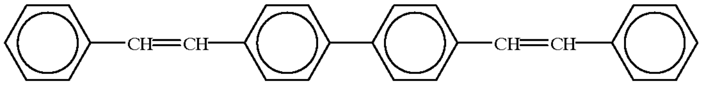,
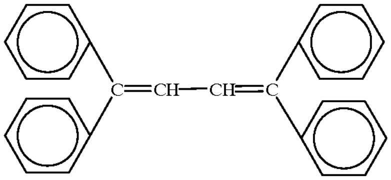,
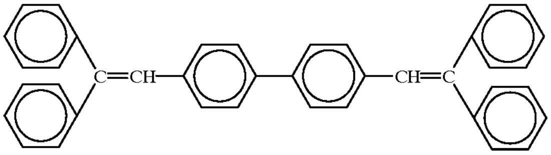,
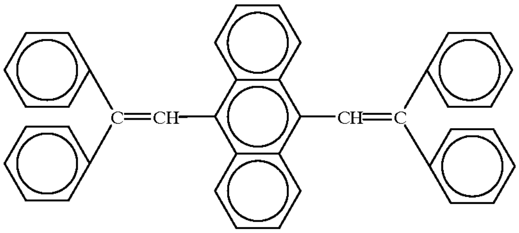,
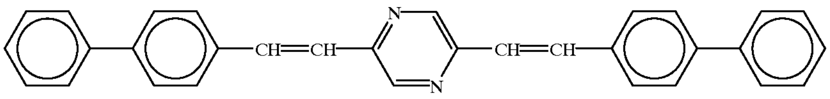,
and
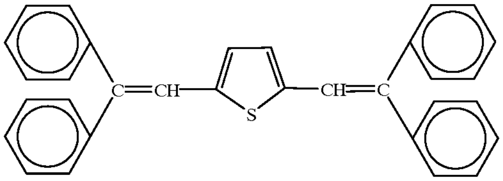.

TABLE 3

| Dopant dyes |
| --- |
| 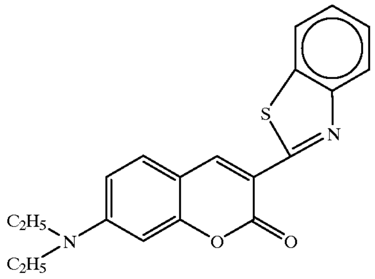 , |
| 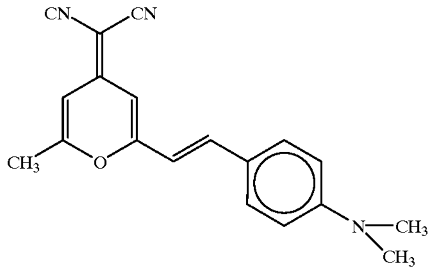 , |
| 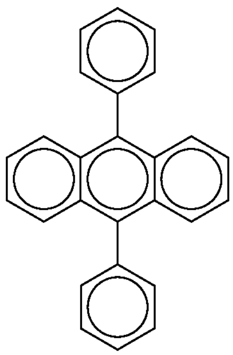 , |
| 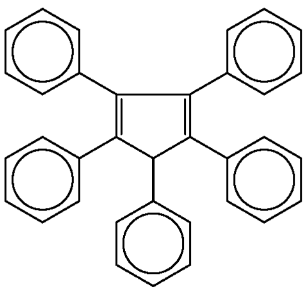 , |
| 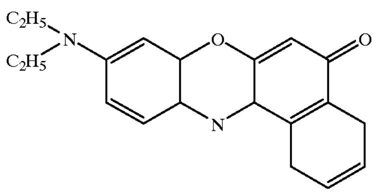 , |

TABLE 3-continued

| Dopant dyes |
| --- |
| 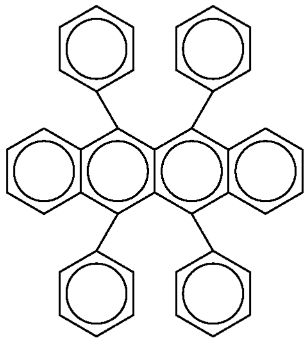 , |
| and |
| 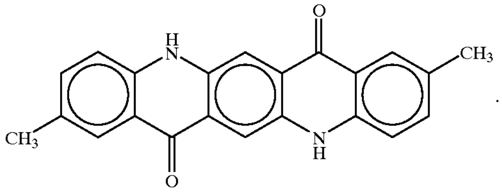 . |

As explained in the foregoing discussion, the present invention employs the novel single-chip light emission element arrays instead of the conventional jointed LED's, thereby reducing the cost of the light emission element array in the image forming apparatus, and improving the color reproducibility in the main scanning direction. Also, since the four single-chip light emission element arrays provided respectively corresponding to the photosensitive members are taken from a single substrate and have therefore substantially equal light emission characteristics, the compensation of the characteristics among the different element arrays can be dispensed with and the cost required therefor can be significantly reduced.

What is claimed is:

1. An image forming apparatus comprising:

a photosensitive member;

an exposure means including a single-chip light emission element array formed by integrating a plurality of light emitting elements in a single chip which exposure means executes the exposure in an entire distance of a main scanning direction relative to a movement of the photosensitive member, by the light emission from said single-chip light emission element array; and a developing means provided around said photosensitive member.

2. The image forming apparatus according to claim 1, wherein said each of said plurality of light emitting elements is a organic light emitting element.

3. The image forming apparatus according to claim 1, wherein said photosensitive member is an electrophotographic photosensitive member.

4. The image forming apparatus according to claim 3, wherein said electrophotographic photosensitive member is an organic electrophotographic photosensitive member.

5. The image forming apparatus according to claim 3, wherein said electrophotographic photosensitive member is an inorganic electrophotographic photosensitive member.

6. The image forming apparatus according to claim 5, wherein said inorganic electrophotographic photosensitive member is an amorphous silicon electrophotographic photosensitive member.

7. An image forming apparatus comprising:

a plurality of photosensitive member provided mutually independently;

an exposure means including a plurality of single-chip light emission element arrays obtained by forming a plurality of light emission element arrays each consisting of a plurality of light emission elements on a single substrate and separating said single substrate into sections so that each of the light emission element arrays is provided on each of the sections, and constructed by positioning said plurality of single-chip light emission element arrays respectively corresponding to said plurality of photosensitive members; and a plurality of developing means provided respectively around said plurality of photosensitive members.

8. The image forming apparatus according to claim 7, wherein each of said plurality of light emission elements is an organic light emitting element.

9. The image forming apparatus according to claim 7, wherein said photosensitive member is an electrophotographic photosensitive member.

10. The image forming apparatus according to claim 9, wherein said electrophotographic photosensitive member is an organic electrophotographic photosensitive member.

11. The image forming apparatus according to claim 9, wherein said electrophotographic photosensitive member is an inorganic electrophotographic photosensitive member.

12. The image forming apparatus according to claim 11, wherein said inorganic electrophotographic photosensitive member is an amorphous silicon electrophotographic photosensitive member.

13. The image forming apparatus according to claim 7, wherein said photosensitive members disposed independently each other are each in the form of a drum and are arrayed linearly.

14. The image forming apparatus according to claim 7, wherein the single-chip light emission element arrays positioned respectively corresponding to said photosensitive members are independently connected to a first drive means for driving cyan image information for forming a cyan image, a second drive means for driving magenta image information for forming a magenta image, and a third drive means for driving yellow image information for forming a yellow image.

15. The image forming apparatus according to claim 7, wherein the single-chip light emission element arrays positioned respectively corresponding to said photosensitive members are independently connected to a first drive means for driving cyan image information for forming a cyan image, a second drive means for driving magenta image information for forming a magenta image, a third drive means for driving yellow image information for forming a yellow image, and a fourth drive means for driving black image information for forming a black image.

16. The image forming apparatus according to claim 7, wherein said developing means comprise a first developing means for generating a cyan image, a second developing means for generating a magenta image, and a third developing means for generating a yellow image which are independently operable each other.

17. The image forming apparatus according to claim 7, wherein said developing means comprise a first developing means for generating a cyan image, a second developing means for generating a magenta image, a third developing means for generating a yellow image, and a fourth developing means for generating a black image which are independently operable each other.

18. The image forming apparatus according to claim 7, wherein each of said single-chip light emission element arrays has such a length that the exposure in a main scanning direction relative to a movement of said plurality of photosensitive members is performed with one single chip.

19. The image forming apparatus according to claim 7, wherein said photosensitive members are respectively in the form of a drum having the same diameter.

20. The image forming apparatus according to claim 7, wherein said photosensitive members are formed from photosensitive layers of the same kind.

* * * * *

UNITED STATES PATENT AND TRADEMARK OFFICE

CERTIFICATE OF CORRECTION

PATENT NO. : 6,236,416 B1
DATED : May 22, 2001
INVENTOR(S) : Masaki Kuribayashi et al.

It is certified that error appears in the above-identified patent and that said Letters Patent is hereby corrected as shown below:

Column 3,
Line 43, "able" should read -- able from --.

Column 4,
Line 39, "Subsequently" should read -- Subsequently, --.

Column 6,
Line 14, "will" should read -- will be --.
Lines 15 and 21, "sub scanning" should read -- subscanning --.

Column 7,
Line 14, "Similarly" should read -- Similarly, --.
Line 51, "contains" should read -- contain --.
Line 66, "independently" each other" should read -- each independently --.

Column 9,
Line 1, "Also" should read -- Also, --.

Column 20,
Line 55, "said" (first occurrence) should be deleted.

Column 21,
Line 4, "member" should read -- members --.
Line 36, "dently" should read -- dently from --.

Column 22,
Lines 21 and 28, "operable" should read -- operable from --.

Signed and Sealed this

Second Day of April, 2002

*Attest:*

JAMES E. ROGAN

*Attesting Officer*

*Director of the United States Patent and Trademark Office*